US010423963B2

(12) United States Patent
Wang et al.

(10) Patent No.: US 10,423,963 B2
(45) Date of Patent: *Sep. 24, 2019

(54) SYSTEMS AND METHODS FOR FRAUD DETECTION BY TRANSACTION TICKET SIZE PATTERN

(71) Applicant: MASTERCARD INTERNATIONAL INCORPORATED, Purchase, NY (US)

(72) Inventors: Qian Wang, Ridgefield, CT (US); Po Hu, Norwalk, CT (US); Ramamohan R. Sangasani, White Plains, NY (US)

(73) Assignee: Mastercard International Incorporated, Purchase, NY (US)

( * ) Notice: Subject to any disclaimer, the term of this patent is extended or adjusted under 35 U.S.C. 154(b) by 8 days.

This patent is subject to a terminal disclaimer.

(21) Appl. No.: 15/868,640

(22) Filed: Jan. 11, 2018

(65) Prior Publication Data

US 2018/0137513 A1 May 17, 2018
US 2018/0349906 A9 Dec. 6, 2018

Related U.S. Application Data

(63) Continuation of application No. 15/231,299, filed on Aug. 8, 2016, now Pat. No. 9,875,475, which is a
(Continued)

(51) Int. Cl.
*G06K 5/00* (2006.01)
*G06Q 20/40* (2012.01)
(Continued)

(52) U.S. Cl.
CPC ........ *G06Q 20/4016* (2013.01); *G06Q 20/34* (2013.01); *G06Q 20/405* (2013.01); *G06Q 40/00* (2013.01)

(58) Field of Classification Search
CPC .... G06Q 30/06; G06Q 30/0601; G06Q 20/20; G06Q 20/34
(Continued)

(56) References Cited

U.S. PATENT DOCUMENTS 7,263,506 B2 8/2007 Lee et al.
7,539,644 B2 5/2009 Hu et al.
(Continued)

*Primary Examiner* — Daniel St Cyr
(74) *Attorney, Agent, or Firm* — Armstrong Teasdale LLP

(57) ABSTRACT

A method and system for detecting fraud in a payment card network using a pattern of transaction ticket size are provided. The method including receiving transaction information, for a current financial transaction, from at least one of a merchant point of sale (POS) device and a merchant website, the transaction information including a current transaction amount, the transaction information associated with a single payment card cardholder, retrieving a predetermined number of historical transactions for the single cardholder based on the transaction information, and generating a historical spend ticket size pattern based on average ticket size and dispersions for at least one of the same store, similar stores, and relevant merchant categories. The method further including comparing the current transaction amount to the historical spend ticket size pattern and generating a recommendation for approval or decline of the current financial transaction based on the comparison.

16 Claims, 9 Drawing Sheets

Related U.S. Application Data continuation of application No. 14/567,124, filed on Dec. 11, 2014, now Pat. No. 9,412,108.

(51) Int. Cl.
*G06Q 20/34* (2012.01)
*G06Q 40/00* (2012.01)

(58) Field of Classification Search
USPC ..................................... 235/380, 382, 383
See application file for complete search history.

(56) References Cited

U.S. PATENT DOCUMENTS

| | | |
|---|---|---|
| 7,707,089 B1 | 4/2010 | Barton et al. |
| 7,788,147 B2 | 8/2010 | Haggerty et al. |
| 7,849,004 B2 | 12/2010 | Choudhuri et al. |
| 7,991,690 B2 | 8/2011 | Choudhuri et al. |
| 8,032,438 B1 | 10/2011 | Barton et al. |
| 8,032,449 B2 | 10/2011 | Hu et al. |
| 8,065,233 B2 | 11/2011 | Lee et al. |
| 8,090,648 B2 | 1/2012 | Zoldi et al. |
| 8,386,376 B2 | 2/2013 | Gomes et al. |
| 8,543,499 B2 | 9/2013 | Haggerty et al. |
| 8,554,666 B2 | 10/2013 | Choudhuri et al. |
| 8,620,801 B2 | 12/2013 | Choudhuri et al. |
| 8,775,301 B2 | 7/2014 | Haggerty et al. |
| 9,412,108 B2 * | 8/2016 | Wang ................. G06Q 20/4016 |
| 9,875,475 B2 * | 1/2018 | Wang ................. G06Q 20/4016 |
| 2006/0149674 A1 | 7/2006 | Cook et al. |
| 2008/0140576 A1 * | 6/2008 | Lewis ................ G06Q 10/0635 |
| | | 705/67 |
| 2011/0016052 A1 * | 1/2011 | Scragg .................. G06Q 20/02 |
| | | 705/44 |
| 2011/0302083 A1 * | 12/2011 | Bhinder ................ G06Q 20/32 |
| | | 705/44 |
| 2012/0101937 A1 | 4/2012 | Zoldi et al. |
| 2012/0197802 A1 | 8/2012 | Smith et al. |
| 2013/0024376 A1 * | 1/2013 | Choudhuri ............ G06Q 40/00 |
| | | 705/44 |
| 2014/0081835 A1 | 3/2014 | Choudhuri et al. |
| 2014/0279309 A1 | 9/2014 | Cowen et al. |
| 2014/0310157 A1 | 10/2014 | Haggerty et al. |
| 2014/0310159 A1 | 10/2014 | Zoldi et al. |
| 2015/0081542 A1 * | 3/2015 | Brereton ............... G06Q 20/4016 |
| | | 705/44 |
| 2015/0161609 A1 * | 6/2015 | Christner ........... G06Q 20/4016 |
| | | 705/44 |

\* cited by examiner

SYSTEMS AND METHODS FOR FRAUD DETECTION BY TRANSACTION TICKET SIZE PATTERN

CROSS REFERENCE TO RELATED APPLICATIONS

This application is a continuation application of U.S. patent application Ser. No. 15/231,299, filed Aug. 8, 2016, entitled "SYSTEMS AND METHODS FOR FRAUD DETECTION BY TRANSACTION TICKET SIZE PATTERN", which is a continuation application of U.S. patent application Ser. No. 14/567,124, filed Dec. 11, 2014, entitled "SYSTEMS AND METHODS FOR FRAUD DETECTION BY TRANSACTION TICKET SIZE PATTERN", which is now U.S. Pat. No. 9,412,108, the disclosures of all these documents are hereby incorporated herein by reference in their entirety.

BACKGROUND

This disclosure relates generally to detecting fraudulent transactions in a payment card system and, more particularly, to computer systems and computer-based methods for comparing current financial transaction to spending patterns established by the cardholder.

Consumers that use credit and debit cards for purchases, both at brick and mortar stores and online, tend to make at least some of their purchases on a routine basis, for example, a cardholder may make the same type of purchases for approximately the same amount at the same stores or online outlets at relatively consistent time intervals. Fraudulent users of the cardholders' payment card tend to make purchases that do not follow the routine established by the cardholder. For example, a fraudulent user may use the cardholder's payment card at different types of stores than the cardholder routinely shops at. Further, the fraudulent cardholder may make larger purchases than the cardholder normally spends.

While the aforementioned payment instruments or cards generally provide account holders a measure of convenience to conduct various transactions, they are susceptible to fraudulent and/or other types of unauthorized use. For example, an unauthorized user may attempt to make purchases or conduct other transactions with a stolen or otherwise ill-gotten payment instrument or card. To protect against these fraudulent and/or unauthorized uses, various approaches have been previously implemented in an effort to ensure that only the account holder named or otherwise identified on the card is able to use the card. For example, the card may carry the account holder's signature. Accordingly, a signature provided by the user of the card at the time of the transaction can be compared to the signature on the card to verify that the user is in fact the account holder. In another example, the user of the card may be required to supply a PIN (Personal Identification Number) or other secret code before a transaction can be initiated with the card. In yet another example, the user of the card may be required to present some secondary form of ID indicating that they are in fact the account holder named or otherwise identified on the card.

Some degree of security against fraudulent or otherwise unauthorized card use is provided by the foregoing solutions. However, these solutions are limited in various respects. For example, signatures can be forged, PINs can be guessed or otherwise become compromised, and false secondary IDs can be created or obtained by unscrupulous individuals.

BRIEF DESCRIPTION

In one embodiment, a computer-implemented method for fraud detection based on a pattern of transaction ticket size on a payment card network is implemented using a computer device coupled to a memory device. The method includes receiving transaction information, for a current financial transaction, from at least one of a merchant point of sale (POS) device and a merchant website wherein the transaction information includes a current transaction amount and the transaction information is associated with a single payment card cardholder. The method further includes retrieving a predetermined number of historical transactions for the single cardholder based on the transaction information and generating a historical spend ticket size pattern based on average ticket size and dispersions for at least one of the same store, similar stores, and in relevant merchant categories. The method further includes comparing the current transaction amount to the historical spend ticket size pattern and generating a recommendation for approval or decline of the current financial transaction based on the comparison.

In another embodiment, a fraud detection computing device for detecting potential fraudulent transactions in a payment card system using transaction ticket size pattern includes a memory for storing data, and a processor in communication with the memory. The processor is programmed to receive transaction information, for a current financial transaction, from at least one of a merchant point of sale (POS) device and a merchant website, the transaction information including a current transaction amount, the transaction information associated with a single payment card cardholder. The processor is also programmed to retrieve a predetermined number of historical transactions for the single cardholder based on the transaction information and generate a historical spend ticket size pattern based on average ticket size and dispersions for at least one of the same store, similar stores, and relevant merchant categories. The processor is further programmed to compare the current transaction amount to the historical spend ticket size pattern and generate a recommendation for approval or decline of the current financial transaction based on the comparison.

In yet another embodiment, one or more non-transitory computer-readable storage media has computer-executable instructions embodied thereon, wherein when executed by at least one processor, the computer-executable instructions cause the processor to receive transaction information, for a current financial transaction, from at least one of a merchant point of sale (POS) device and a merchant website, the transaction information including a current transaction amount, the transaction information associated with a single payment card cardholder. The instructions further causing the processor to retrieve a predetermined number of historical transactions for the single cardholder based on the transaction information and generate a historical spend ticket size pattern based on average ticket size and dispersions for at least one of the same store, similar stores, and relevant merchant categories. The instructions further causing the processor to compare the current transaction amount to the historical spend ticket size pattern and generate a recommendation for approval or decline of the current financial transaction based on the comparison.

BRIEF DESCRIPTION OF THE DRAWINGS

FIG. 1 is a schematic diagram illustrating an example multi-party payment card industry system having a transaction ticket size pattern module and that enables payment-by-card transactions between merchants and cardholders.

FIG. 2 is a simplified block diagram of an example payment processing system including a plurality of computer devices including the transaction ticket size pattern module shown in FIG. 1 in accordance with one example embodiment of the present disclosure.

FIG. 3 is an expanded block diagram of an example embodiment of a server architecture of the payment processing system shown in FIG. 2 in accordance with one example embodiment of the present disclosure.

FIG. 4 illustrates an example configuration of a user system operated by a user, such as the cardholder shown in FIG. 1.

FIG. 5 illustrates an example configuration of a server system such as the server system shown in FIGS. 2 and 3.

FIG. 6 is a data flow diagram of a purchase transaction implemented using the transaction ticket size pattern module of the payment processing system shown in FIG. 2.

FIG. 7 is a data flow diagram of an example embodiment of the transaction ticket size pattern module of the payment processing system shown in FIG. 2.

FIG. 8 is a component view of an example transaction ticket size pattern module of payment processing system shown in FIG. 2.

FIG. 9 is a flow chart of a method of fraud detection based on a pattern of transaction ticket size on a payment card network.

DETAILED DESCRIPTION

Figure 1:
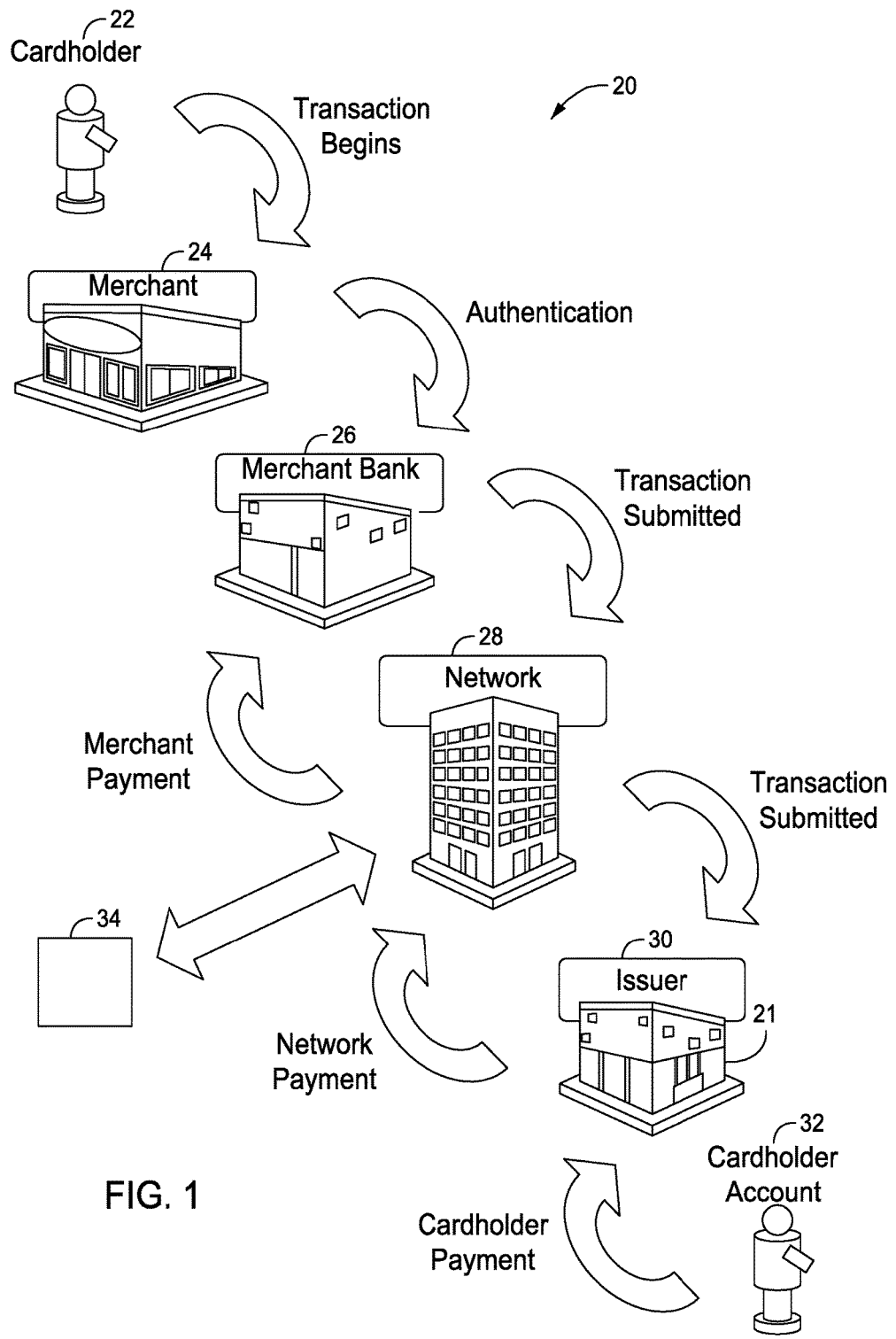
FIGS. 1-9 show example embodiments of the methods and systems described herein.

Embodiments of the methods and systems described herein relate to an application executing on or in cooperation with a payment card network that receives transaction information relating to an item or service the merchant has for sale. Payment card cardholders generally develop patterns of use of their payment card over time. One of these patterns relates to a size of the spend in each transaction, another pattern is a frequency of the occurrence of the transactions. Each of these patterns are considered in relation to an industry category of the merchant or even the particular merchant. For example, a payment card cardholder may establish a pattern of purchasing gasoline for their automobile. The type of automobile and a typical amount of driving tend to establish an amount of gasoline that is needed to be purchased on a periodic basis. Additionally, variations in the typical driving patterns may indicate that a range of gasoline purchases on a periodic basis better defines the cardholder's typical pattern for purchasing gasoline. Given the cardholder' driving pattern and relatively fixed other parameters that affect the amount of gasoline purchased, a transaction amount and a frequency of the transactions can be established.

One of the events that may break these patterns is fraudulent use of the card. A fraudulent user is not expected to have the same spend patterns as the cardholder. A fraudulent user is expected to make purchases having relatively large amounts and at a greater frequency than the cardholder. By comparing the transaction amount of each purchase transaction of a single cardholder to a historical ticket size pattern and dispersions (also referred to as a standard deviation) for the cardholder, an indication of fraudulent use of the payment card may be detected. As used herein, ticket size refers to an amount of a single transaction. In some embodiments ticket size refers to an amount of a plurality of transactions related to a single category of goods, subdivision of a business entity, industry of a merchant, or the like. As used herein, ticket size pattern refers to a behavior of a cardholder represented by characteristics of purchases made by the cardholder over a predetermined period of time, deviations from which may indicate fraudulent use of the payment card.

An authorization request recommendation based on a historical ticket size pattern of a cardholder's payment transaction amounts may include a number of steps. A transaction is attempted at a merchant via POS or online. The transaction information is transmitted electronically to an interchange network where a card number acquired during the transaction is matched to corresponding records in a database in the interchange network. The transaction information also includes a merchant identifier, a transaction amount, transaction category, and a transaction type (POS or online). Using the card number, all, or a sufficiently large number of transactions (approved or declined) associated with the payment card number are retrieved. A historical ticket size pattern is created based on average ticket size or amount and dispersions at the same store, similar stores, and relevant merchant categories. The current transaction amount is compared with the historical spend ticket size pattern, and similarity measurements are created and input into a modeling process. The similarity measurements include analytical parameters that related to a regularity and frequency of purchase, an aggregate amount or ticket size per selectable time periods, and seasonal adjustments to the analytical parameters. For example, a cardholder's consumption of a particular good or service may be consistent over a long time period. The similarity measurements would reflect that the cardholder purchases the good of service at a consistent interval and at relatively fixed amounts, meaning each transaction for the good service occurs regularly for a consistent amount. The transaction for the consistent amount could occur at any interval. Once a week, once a month, once a quarter, etc. The purchase does not need to occur at the same part of the time period for the similarity measurement to note the purchase transaction is part of a regular pattern. For each transaction in a specific category, the system will determine whether the current transaction ticket size is dramatically different from a normal ticket size. With other measurement and models, such as information from travel tickets, the system can recommend approval or disapproval a transaction from a ticket size perspective.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a sever computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example multi-party payment card industry system having a transaction ticket size pattern module and that enables payment-by-card transactions between merchants and cardholders. Embodiments described herein may relate to a financial transaction card system, such as a payment card network operated by MasterCard International Incorporated. The payment card network, as described herein, is a four-party payment card network that includes a plurality of special purpose processors and data structures stored in one or more memory devices communicatively coupled to the processors, and a set of proprietary communications standards promulgated by MasterCard International Incorporated for the exchange of financial transaction data and the settlement of funds between financial institutions that are members of the payment card network. As used herein, financial transaction data includes a unique account number associated with a cardholder using a payment card issued by an issuer, purchase data representing a purchase made by the cardholder, including a type of merchant, amount of purchase, date of purchase, and other data, which may be transmitted between any parties of multi-party payment processing system 20.

In a typical payment card system, a financial institution called the "issuer" issues a payment card, such as a credit card, to a consumer or cardholder 22, who uses the payment card to tender payment for a purchase from a merchant 24. To accept payment with the payment card, merchant 24 must normally establish an account with a financial institution that is part of the financial payment processing system. This financial institution is usually called the "merchant bank," the "acquiring bank," or the "acquirer."

When cardholder 22 tenders payment for a purchase with a payment card, merchant 24 requests authorization from a merchant bank 26 for the amount of the purchase. The request may be performed over the telephone, online, or through the use of a point-of-sale terminal, which reads the cardholder's account information from a magnetic stripe, a chip, or embossed characters on the payment card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using a payment card network 28, computers of merchant bank 26 or merchant processor will communicate with computers of an issuer bank 30 to determine whether cardholder's account 32 is in good standing and whether the purchase is covered by cardholder's available credit line. To limit an amount of fraud that may occur during such transactions a fraud detection module may be employed to screen and analyze the received transaction data. In the example embodiment, a transaction ticket size pattern module 34 evaluates historical transaction data for patterns of usage by the cardholder. The patterns relate to an amount of spend in categories of goods, categories of stores, individual stores, and seasonal variations. The patterns are used in a model to evaluate how closely current transactions comport with the established patterns. A score is generated that may be a stand-alone determination of the fraud risk of a transaction or may be a component of a larger determination of the fraud evaluation performed by, for example, merchant 24, issuer 30, or both. Ticket size pattern module 34 may be a stand-alone system that interfaces with network 28 directly from a remote location or may be a component of systems of network 28. Based on these determinations, the request for authorization will be declined or accepted. If the request is accepted, an authorization code is issued to merchant 24.

When a request for authorization is accepted, the available credit line of cardholder's account 32 is decreased. Normally, a charge for a payment card transaction is not posted immediately to cardholder's account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Payment card network 28 and/or issuer bank 30 stores the financial transaction data, such as a type of merchant, amount of purchase, date of purchase, in a database 120 (shown in FIG. 2).

For debit card transactions, when a request for a PIN authorization is approved by the issuer, the consumer's account is decreased. Normally, a charge is posted immediately to a consumer's account. The issuer 30 then transmits the approval to the merchant bank 26 via the payment network 28, with ultimately the merchant 24 being notified for distribution of goods/services, or information or cash in the case of an ATM.

After a purchase has been made, a clearing process occurs to transfer additional transaction data related to the purchase among the parties to the transaction, such as merchant bank 26, payment card network 28, and issuer bank 30. More specifically, during and/or after the clearing process, additional data, such as a time of purchase, a merchant name, a type of merchant, purchase information, cardholder account information, a type of transaction, product or service for sale information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among the merchant's account, merchant bank 26, and issuer bank 30 related to the transaction. Usually, transactions are captured and accumulated into a "batch," which is settled as a group. More specifically, a transaction is typically settled between issuer bank 30 and payment card network 28, and then between payment card network 28 and merchant bank 26, and then between merchant bank 26 and merchant 24.

Network 28 is configured to interface with transaction ticket size pattern module 34 configured to process historical transaction data for a plurality of cardholders. Transaction ticket size pattern module 34 receives the historical transaction data and processes the transaction data to extract information that is transmitted to a model included as part of transaction ticket size pattern module 34 or a part of server 112.

Figure 2:
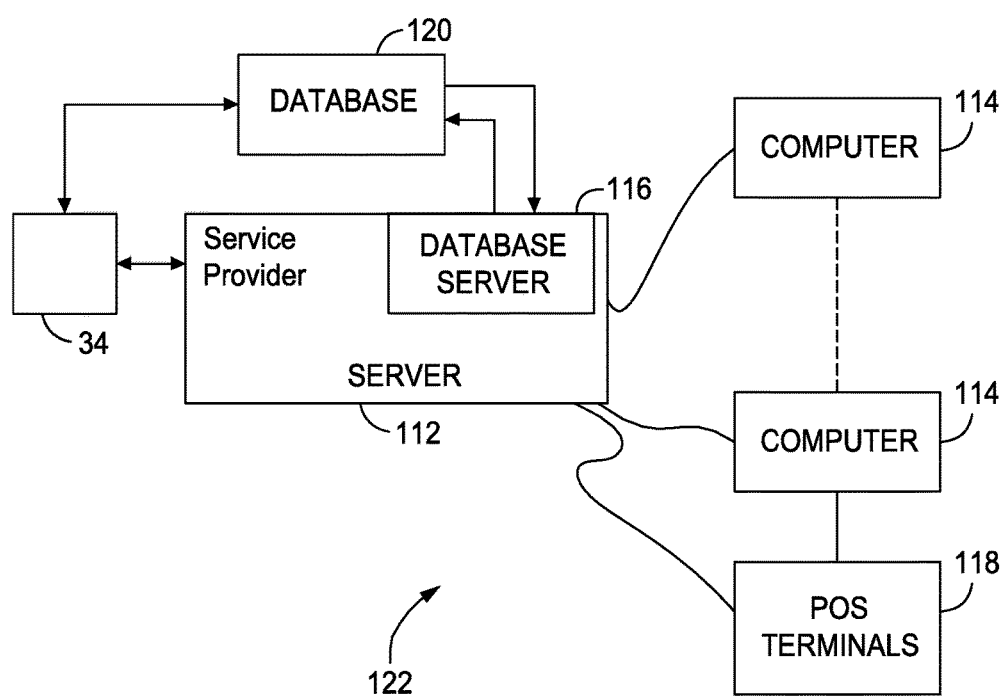

FIG. 2 is a simplified block diagram of an example payment processing system 122 including a plurality of computer devices including transaction ticket size pattern module 34 in accordance with one example embodiment of the present disclosure. In the example embodiment, the plurality of computer devices includes, for example, server system 112, client systems 114, and ticket size pattern module 34.

More specifically, transaction ticket size pattern module 34 in communication with server system 112 is configured to receive historical card-present and card-not-present payment card transaction data from a plurality of merchants for cardholders associated with respective unique primary account numbers. Using the merchant information and transaction amount contained within the received card-present payment card transaction data, transaction ticket size pattern module 34 is configured to determine a spending pattern profile of a cardholder. The spending pattern profile may include a ticket size pattern profile and other profiles relating to categories of spending, spend frequency, and a variation in spend per visit to a merchant store or website. The spending pattern profile may also be specific to a particular industry, or merchant category. For example, a first spending pattern profile may be determined for a hardware or home improvement industry. A second spending pattern profile may be determined for a grocery industry.

More specifically, in the example embodiment, payment processing system 122 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

Payment processing system 122 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, purchases made. Database 120 may also store account data including at least one of a cardholder name, a cardholder address, a primary account number (PAN) associated with the cardholder name, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may store picture files associated with the item or service for sale by the merchant user, name, price, description, shipping and delivery information, instructions for facilitating the transaction, and other information to facilitate processing according to the method described in the present disclosure.

Database 120 interfaces with ticket size pattern module 34 to provide ticket size pattern module 34 with transaction information matched to a card number acquired during the transaction. The transaction information includes a merchant identifier, a transaction amount, transaction category, and a transaction type (POS or online). Additional transaction information may be provided.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with payment card network 28. In the example embodiment, server system 112 is associated with a financial transaction processing network, such as payment card network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment processing system, a biller, and a transaction ticket size pattern module 34. Transaction ticket size pattern module 34 may be associated with payment card network 28 or with an outside third party in a contractual relationship with payment card network 28. Accordingly, each party involved in processing transaction data are associated with a computer system shown in payment processing system 122 such that the parties can communicate with one another as described herein.

Using payment card network 28, the computers of the merchant bank or the merchant processor communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
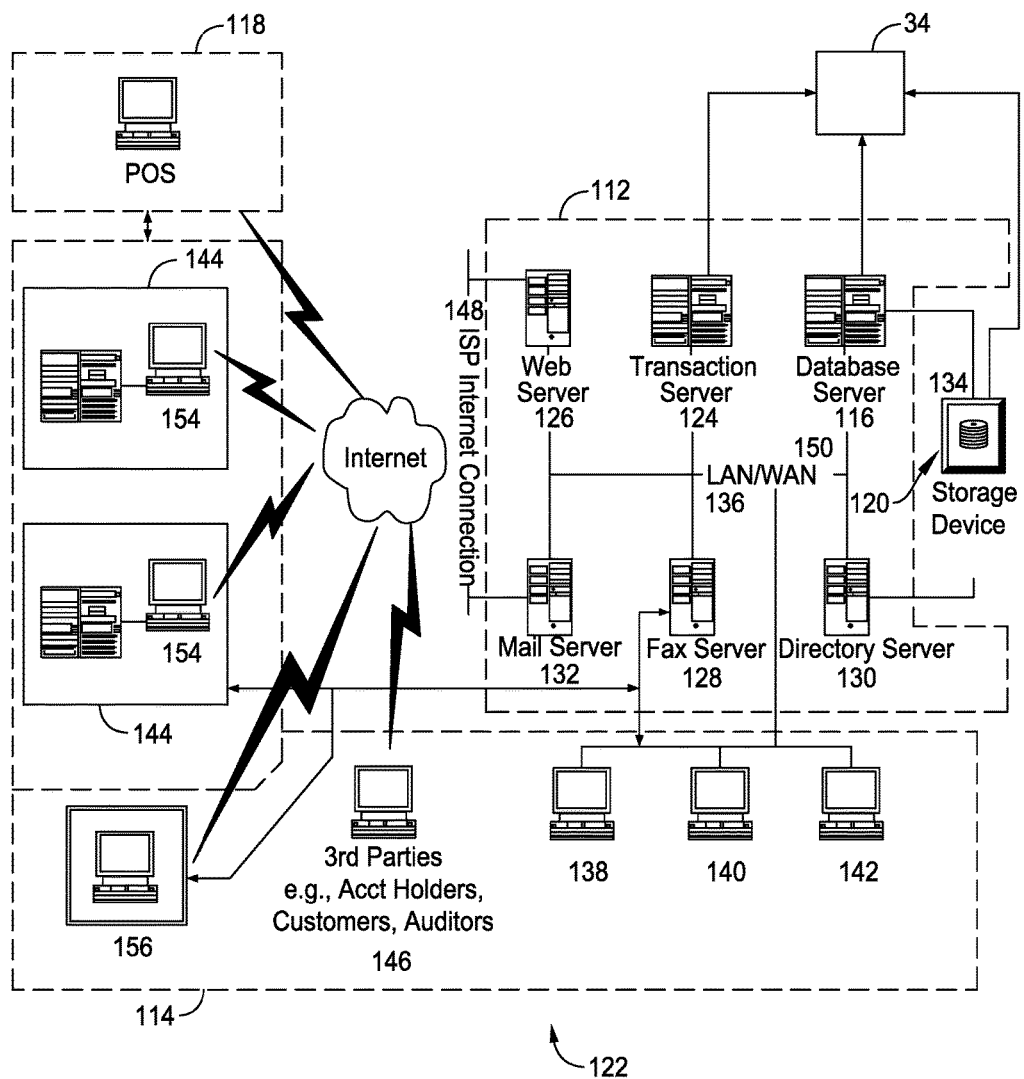

FIG. 3 is an expanded block diagram of an example embodiment of a server architecture of the payment processing system 122 shown in FIG. 2 in accordance with one example embodiment of the present disclosure. Components in system 122, identical to components of payment processing system 122 (shown in FIG. 2), are identified in FIG. 3 using the same reference numerals as used in FIG. 2. System 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet. Processing system 122 also includes transaction ticket size pattern module 34.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the example embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Transaction ticket size pattern module 34 is communicatively coupled to database 120, application server 124, and database server 116 to request transaction data and receive the transaction data.

Figure 4:
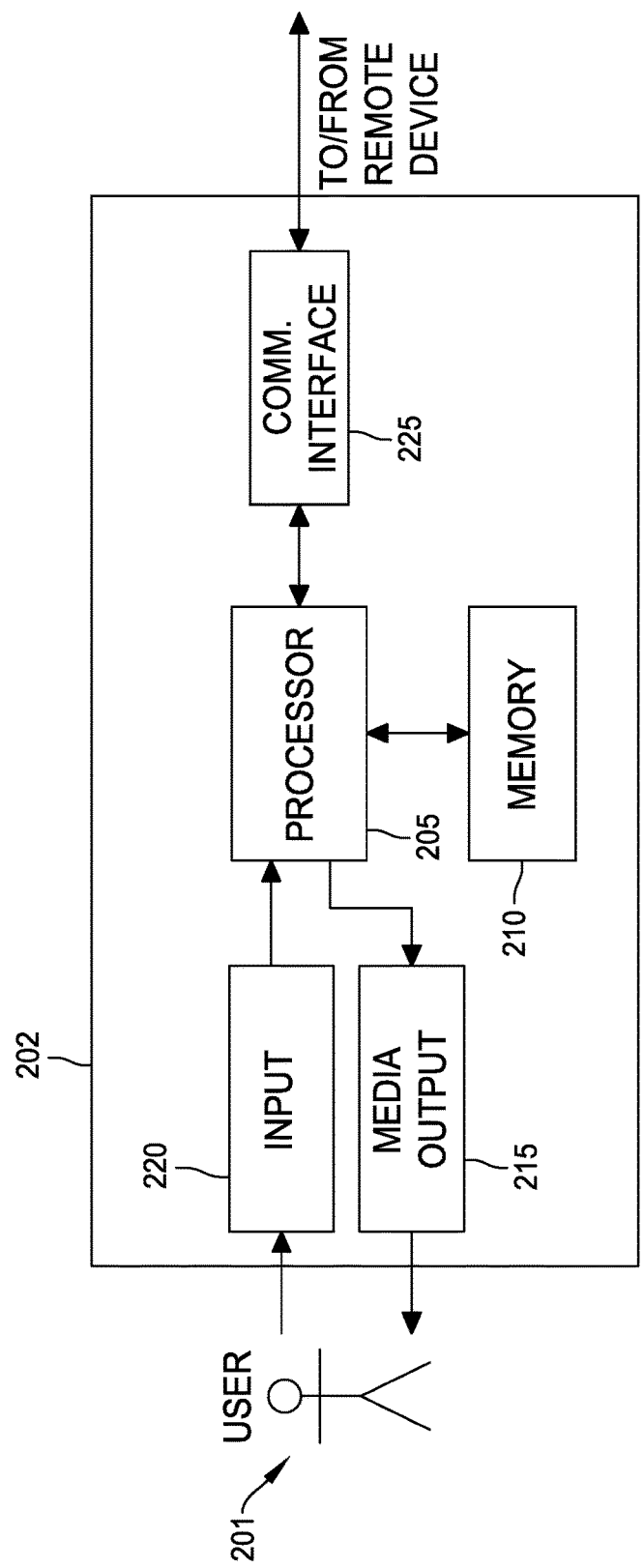

FIG. 4 illustrates an example configuration of a user system 202 operated by a user 201, such as cardholder 22

(shown in FIG. 1). User system 202 may include, but is not limited to, client systems 114, 138, 140, and 142, POS terminal 118, workstation 154, and manager workstation 156. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a web site from server system 112. A client application allows user 201 to interact with a server application from server system 112.

Figure 5:
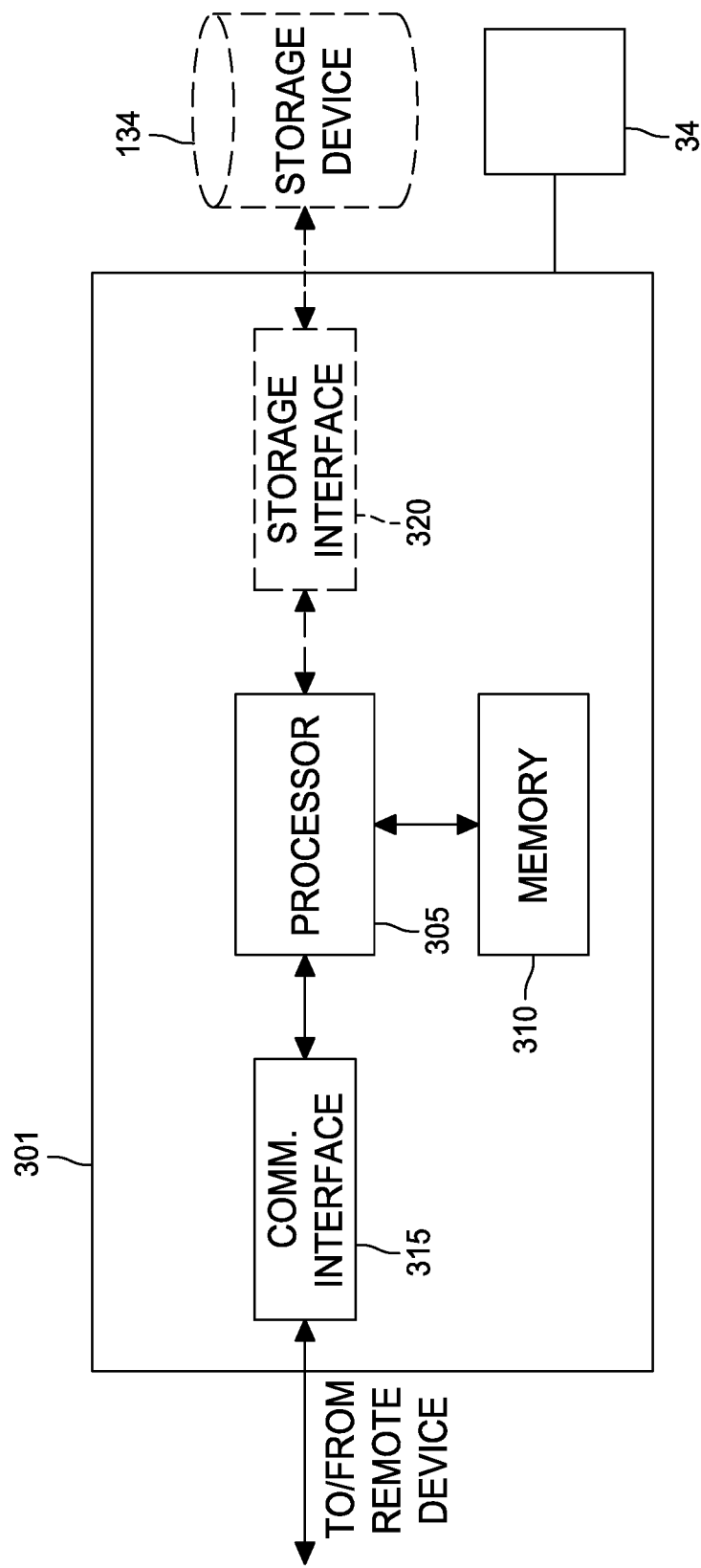

FIG. 5 illustrates an example configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Server system 301 may be a part of or communicatively coupled to transaction ticket size pattern module 34. Transaction ticket size pattern module 34 in communication with server system 112 is configured to receive transaction information for a plurality of transactions conducted by a cardholder. The transaction information includes a merchant identifier, a transaction amount, transaction category, and a transaction type (POS or online). The transaction information is used to establish a pattern of usage of the payment card associated with the cardholder. The pattern of usage or cardholder profile indicates the spending habits or the cardholder. The pattern of usage establishes a baseline of spending of the cardholder for various goods, categories of businesses, such as, but, not limited to hardware, grocery, clothing, electronics, restaurants, and the like. The baseline of spending also includes an average amount spent at each category of business and a typical variation in the amount such as a standard deviation from the average amount spent per visit or per time period. For each new transaction by a cardholder, transaction information is received by transaction ticket size pattern module 34 and analyzed with respect to the profile of the cardholder. Transaction ticket size pattern module 34 determines whether parameters of the new transaction are within threshold ranges of determined parameters of the cardholder profile. For example, if the ticket size, or amount of the transaction is within a predetermined range about an average amount and whether a total amount of spending for a predetermined time period is within a predetermine range of the total amount of spending for a similar time period in the cardholder profile. In the example embodiment, transaction ticket size pattern module 34 is external to server system 301 and may be accessed by multiple server systems 301. For example, transaction ticket size pattern module 34 may be a computing device coupled to a memory unit. In some embodiments, transaction ticket size pattern module 34 may be integrated with server system 301. For example, transaction ticket size pattern module 34 may be a specifically programmed section of server system 301 configured to perform the functions described herein when executed by processor 305.

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

Figure 6:
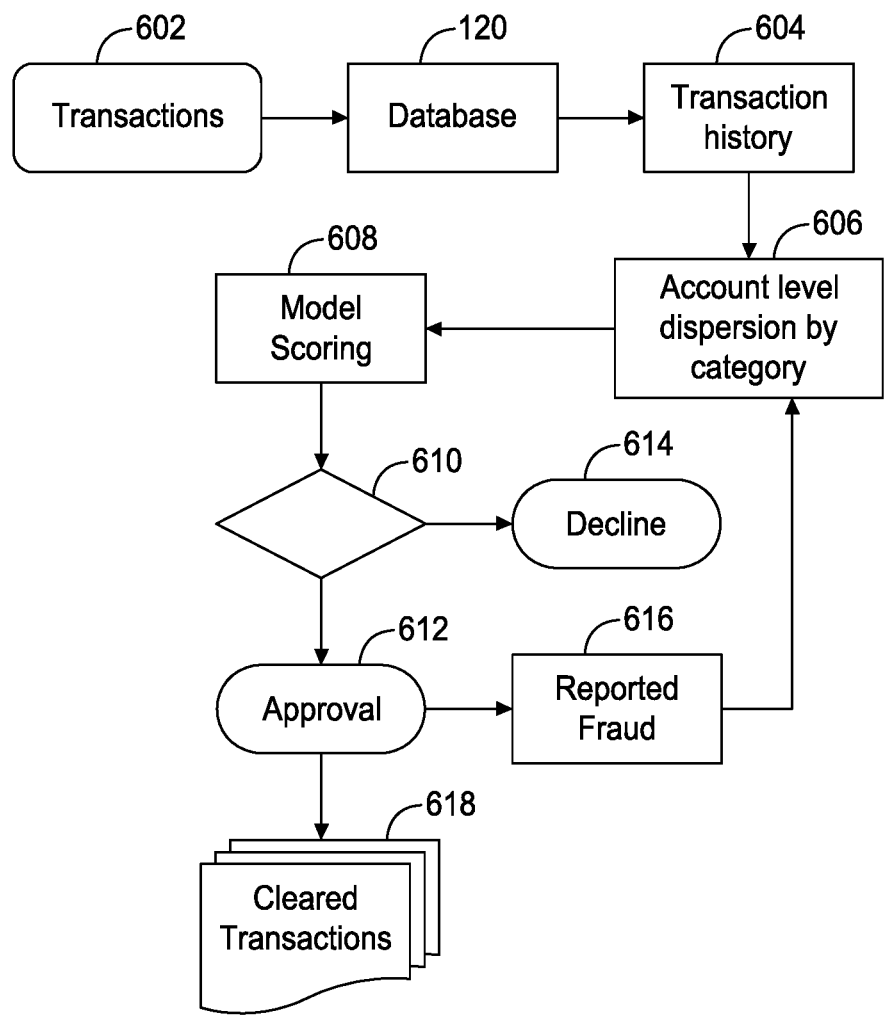

FIG. 6 is a data flow diagram 600 of a purchase transaction implemented using transaction ticket size pattern module 34 of payment processing system 122 (shown in FIG. 2). In the example embodiment, a transaction 602 is attempted at merchant 24 via POS or an online website associated with merchant 24. The transaction information is transmitted to network 28. The card number of the payment card being used for the transaction is matched with historical transactions conducted using the same card number in, for example, database 120 (shown in FIG. 2). From the historical transactions, the merchant or store ID, transaction amount, transaction category, and transaction type (whether card-present or card-not-present) are determined. Using the payment card number, a predetermined number of transactions (approved or declined) associated with the payment card are extracted 604. For example, the predetermined number of transactions may represent a statistically significant number of transactions or the transactions from a selectable time period.

A historical ticket size pattern is created 606 based on average ticket size and dispersions at the same store, similar stores, and relevant merchant categories. A current transaction amount is compared with the historical spend ticket size pattern, and similarity measurements are created and input into a modeling process 608. For some frequent spending categories, the cardholder's consumption level can be represented by a frequency and an average ticket size. For example, a card may used at a grocery store where the purchase transactions equal approximately $50+/−$5, three times per week. With other dimensions or parameters relating to the cardholder account or the particular transaction, an alert may be generated if a new transaction is swiped with value that exceeds a predetermined range about a normal or average transaction value determined for that cardholder, for example, $25 or $85. For each transaction in a specific category, transaction ticket size pattern module 34 determines whether the current transaction ticket size exceeds a predetermined range about an average or normal ticket size determined for that cardholder. With other measurement and models, such as information from travel tickets, transaction ticket size pattern module 34 can recommend 610 approval 612 or decline 614 of a transaction from a ticket size perspective. Reported fraud 616 may be reported, which is used in future transaction evaluations. Cleared transactions 618 are stored for future processing.

An algorithm that may be used with transaction ticket size pattern module 34 may include:

For a transaction, in a brick and mortar store or online (BM/OL) is represented by (k) and a category of the BM/OL is represented by (i): Amount $A(k,i,t)$ and transaction count $N(k,i,t)$.

$$A(k,i) = \Sigma_t A(k,i,t) \tag{1}$$

where,
A represents a transaction amount,
k represents whether transaction is online or at bricks-mortar store,
i represents an industry category (one of the 100+industries available), and
t represents a time duration considered.

$$N(k,i) = \Sigma_t N(k,i,t) \tag{2}$$

where, N represents a transaction count.

$$T(k, i) = \frac{A(k, i)}{N(k, i)} \tag{3}$$

where, T represents a ticket size.

$$\sigma(k, i) \sim \sqrt{\frac{\Sigma_t A^2(k, i, t)}{N(k, i)} - T^2(k, i)} \tag{4}$$

where, σ represents a standard deviation of ticket size,

For $N(k, i) = 0 : D(k, i) = A(k, i, t + 1)$
=0 there is no history,
=1 there was one transaction in the past
≥2 there are more than 1 transaction in the past For a new transaction:

$$A(k,i,t+1) \tag{5}$$

For $(k,i) \geq 2$: $D(k,i) = A(k,i,t+1) - \{T(k,i) + \alpha_2(k,i)\sigma(k,i)\}$ (6)

For $N(k,i)=1$: $D(k,i) = A(k,i,t+1) - \alpha_1(k,i)T(k,i)$ (7)

For $N(k,i)=0$: $D(k,i) = A(k,i,t+1) - \alpha_0(k,i)$ (8)

Overall:

$D(k,i) = A(k,i,t+1) - \delta_{n=0}\alpha_0(k,i) - \delta_{n=1}\alpha_1(k,i)T(k,i) - \delta_{n \geq 2}\{T(k,i) + \alpha_2(k,i)\sigma(k,i)\}$ (9)

Values for a range of an amount for future transactions is determined by modeling and a parameter $\alpha_n(k,i)$ is determined by the logistic equation:

$$\ln\left(\frac{B(k, i)}{G(k, i)}\right) = D(k, i) \tag{10}$$

A cut-off of $D(k,i)$ as an alert by weight is determined back to the original universe.

Here, $\alpha_n(k,i)$ are model coefficients, and $\delta_{n=i}$ is a delta function which equals 1 when n=i and 0 otherwise.

The model is configured to find a best function of D and other variables to create maximal separation between future good (G) and bad (B) transactions.

Figure 7:
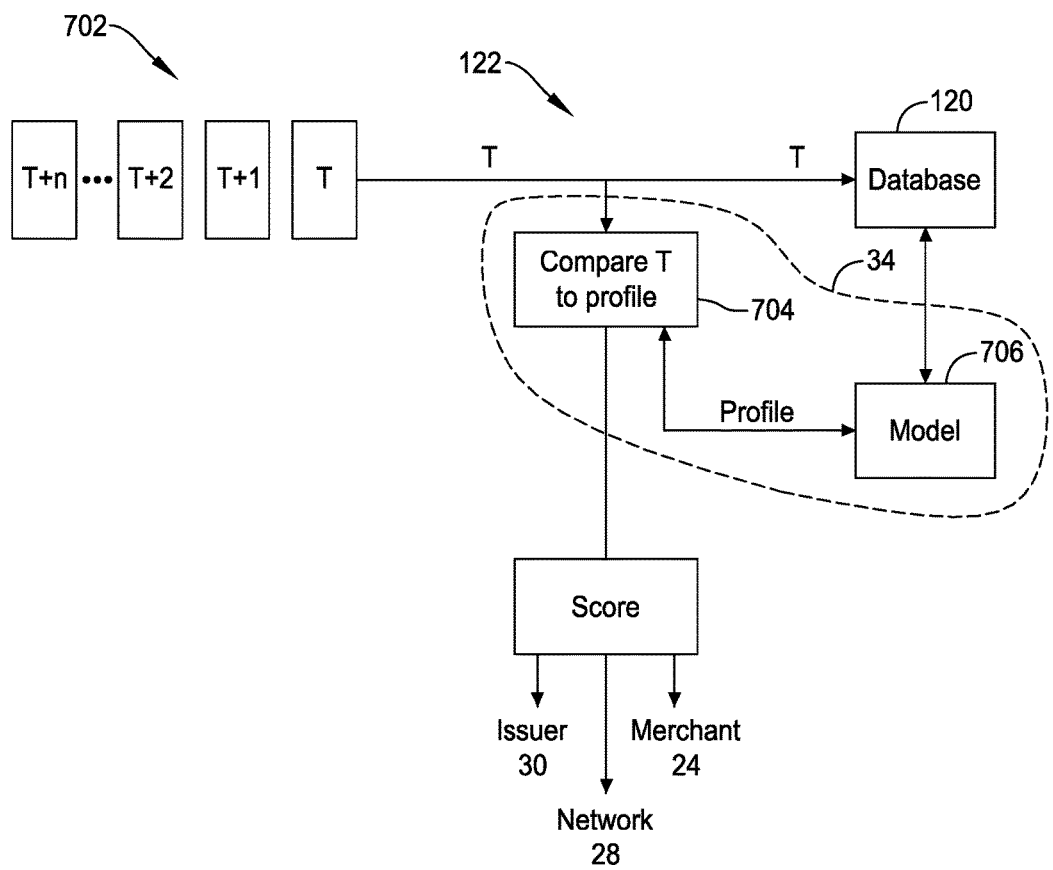

FIG. 7 is a data flow diagram of an example embodiment of transaction ticket size pattern module 34 of payment processing system 122 (shown in FIG. 2). In the example embodiment, transaction ticket size pattern module 34 is in communication with payment processing system 122 or is a part of payment processing system 122. A plurality of payment card transactions 702 are received by payment processing system 122 from a plurality of merchants 24 (shown in FIG. 1) for a plurality of cardholders 22 (shown in FIG. 1). The transactions may be received in batch or each transaction may be received in real-time during the transaction. The transactions are directed to database 120 and may also be received by a transaction ticket size pattern comparison module 704 of transaction ticket size pattern module 34. Plurality of transactions 702 are stored in database 120 where they are accessible to a transaction ticket size pattern model 706. In an embodiment, transaction ticket size pattern model 706 includes an algorithm, such as, the algorithm described above with reference to FIG. 6. Moreover, transaction ticket size pattern model 706 may include several selectable algorithms that are configured to account for variations of parameters relating to plurality of transactions 702 and a score or approval/decline recommendation desired. For example, transaction ticket size pattern model 706 my use separate algorithms to account for seasonal variations of a cardholder's transaction ticket size pattern. Transaction ticket size pattern model 706 is configured to generate profiles of the cardholder's historical spending behavior and transmit the profiles to transaction ticket size pattern comparison module 704 for evaluation of incoming new transactions 702.

Initially, transaction ticket size pattern module 34 executes transaction ticket size pattern model 706 on plurality of payment card transactions 702 that are stored in database 120. After initial profiles are established, transaction ticket size pattern model 706 may use incoming new transactions 702 to update the existing cardholder profiles or may execute transaction ticket size pattern model 706 on database 120 updated with incoming new transactions 702. A transaction ticket size pattern score is generated using the profiles and transmitted to merchant 24, issuer 30, and/or network 28 for incorporation into an authorization request response. In some embodiments, the transaction ticket size pattern score is used to directly affect the approval/decline decision for the transaction. In other embodiments, the transaction ticket size pattern score forms a portion of the approval/decline decision for the transaction made by issuer 30 and/or merchant 24.

Figure 8:
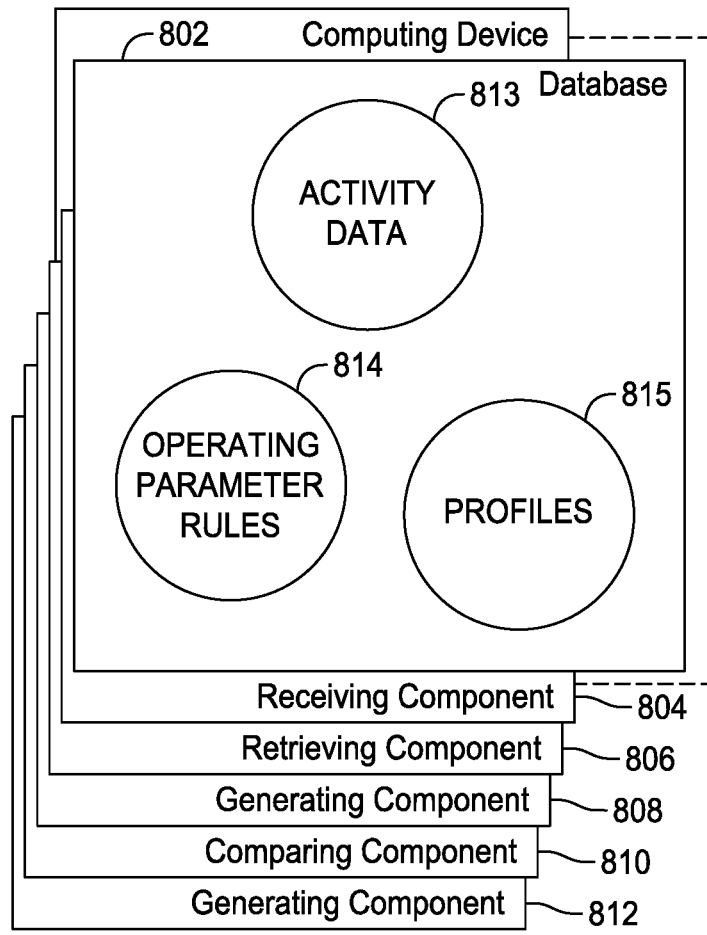

FIG. 8 is a component view of an example transaction ticket size pattern module 34 of payment processing system 122 (shown in FIG. 2). In the example embodiment, transaction ticket size pattern module 34 includes a database 802. Database 802 stores, for example, financial transaction data 813 received from, for example, server system 112 (shown in FIG. 2). Database 802 may further store operating parameter rules 814 and cardholder profiles 815.

In the example embodiment, transaction ticket size pattern module 34 further includes a receiving component 802 configured to receive transaction information from for example, at least one of a merchant point of sale (POS) device and a merchant website, the transaction information including a current transaction amount, the transaction information associated with a single payment card cardholder. Transaction ticket size pattern module 34 further includes a retrieving component 804 configured to retrieve a predetermined number of historical transactions for the single cardholder based on the transaction information. Transaction ticket size pattern module 34 further includes a generating component 806, a historical spend ticket size pattern based on average ticket sixe and dispersions for at least one of the same store, similar stores, and relevant merchant categories. Transaction ticket size pattern module 34 further includes a comparing component 810 configured to compare the current transaction amount to the historical spend ticket size pattern and a generating component 812 configured to generate a recommendation for approval or decline of the current financial transaction based on the comparison.

Figure 9:
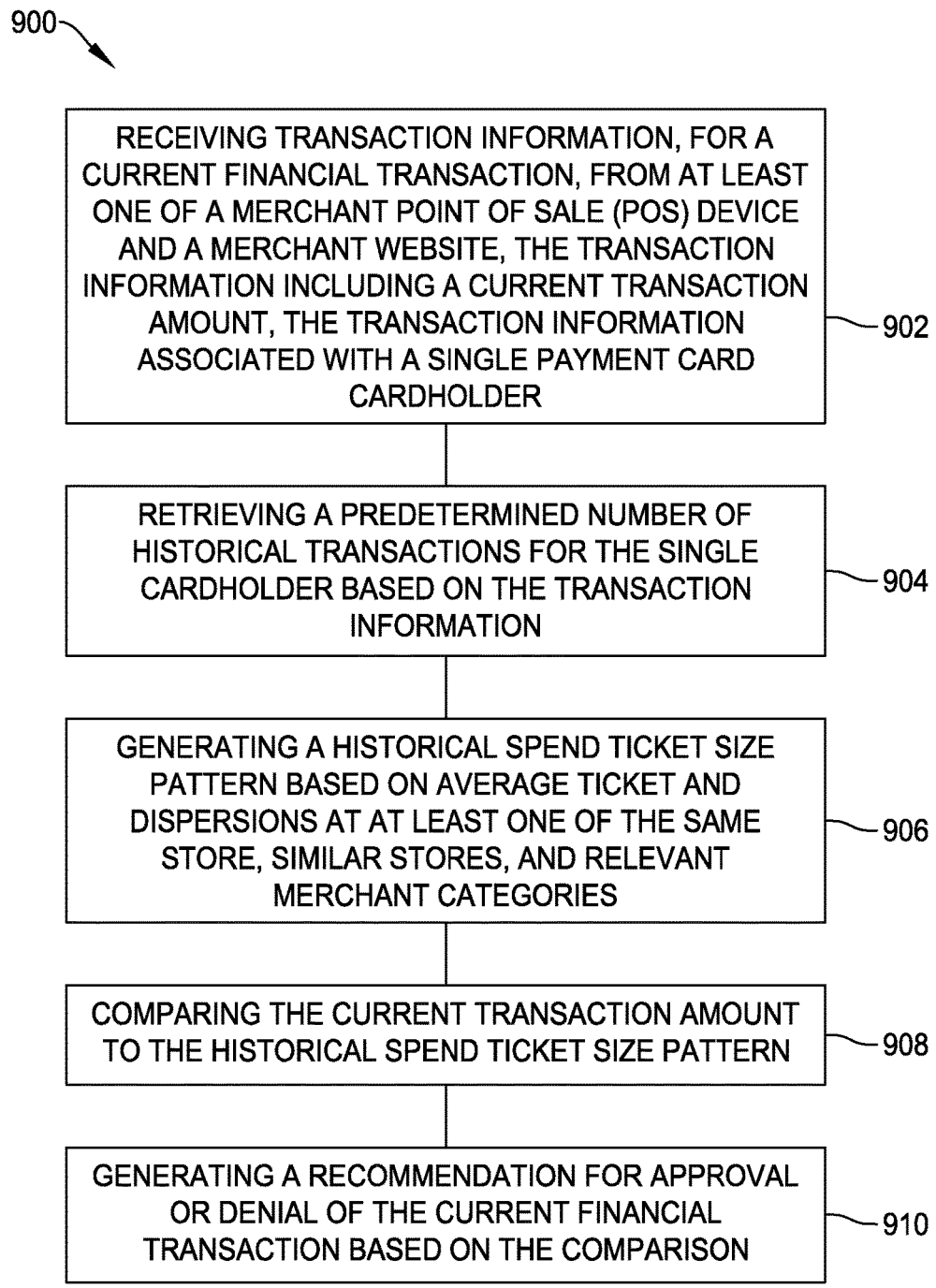

FIG. 9 is a flow chart of a method 900 of fraud detection based on a pattern of transaction ticket size on a payment card network. In the example embodiment, method 900 includes receiving 902 transaction information, for a current financial transaction, from at least one of a merchant point of sale (POS) device and a merchant website, the transaction information including a current transaction amount, the transaction information associated with a single payment card cardholder. Method 900 further includes retrieving 904 a predetermined number of historical transactions for the single cardholder based on the transaction information and generating 906 a historical spend ticket size pattern based on average ticket size and dispersions at at least one of the same store, similar stores, and relevant merchant categories. Method 900 further includes comparing the current transaction amount to the historical spend ticket size pattern and generating a recommendation for approval or decline of the current financial transaction based on the comparison.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by mobile devices, clusters, personal computers, workstations, clients, servers, and processor 205, 305 wherein the memory includes RAM memory, ROM memory, EPROM memory, EEPROM memory, and non-volatile RAM (NVRAM) memory. The above memory types are examples only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting program, having computer-readable and/or computer-executable instructions, may be embodied or provided within one or more computer-readable media, thereby making a computer program product, i.e., an article of manufacture, according to the discussed embodiments of the disclosure. The computer readable media may be, for instance, a fixed (hard) drive, diskette, optical disk, magnetic tape, semiconductor memory such as read-only memory (ROM) or flash memory, etc., or any transmitting/receiving medium such as the Internet or other communication network or link. The article of manufacture containing the computer code may be made and/or used by executing the instructions directly from one medium, by copying the code from one medium to another medium, or by transmitting the code over a network. The technical effect of the methods and systems may be achieved by performing at least one of the following steps: (a) receiving transaction information, for a current financial transaction, from at least one of a merchant point of sale (POS) device and a merchant website, the transaction information including a current transaction amount, the transaction information associated with a single payment card cardholder; (b) retrieving a predetermined number of historical transactions for the single cardholder based on the transaction information; (c) generating a historical spend ticket size pattern based on average ticket size and dispersions at at least one of the same store, similar stores, and relevant merchant categories; (d) comparing the current transaction amount to the historical spend ticket size pattern; and (e) generating a recommendation for approval or decline of the current financial transaction based on the comparison.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As used herein, the term "computer" and related terms, e.g., "computing device", are not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

As used herein, the term "cloud computing" and related terms, e.g., "cloud computing devices" refers to a computer architecture allowing for the use of multiple heterogeneous computing devices for data storage, retrieval, and processing. The heterogeneous computing devices may use a common network or a plurality of networks so that some computing devices are in networked communication with one another over a common network but not all computing devices. In other words, a plurality of networks may be used in order to facilitate the communication between and coordination of all computing devices.

As used herein, the term "mobile computing device" refers to any of computing device which is used in a portable manner including, without limitation, smart phones, personal digital assistants ("PDAs"), computer tablets, hybrid phone/computer tablets ("phablet"), or other similar mobile device capable of functioning in the systems described herein. In some examples, mobile computing devices may include a variety of peripherals and accessories including, without limitation, microphones, speakers, keyboards, touchscreens, gyroscopes, accelerometers, and metrological devices. Also, as used herein, "portable computing device" and "mobile computing device" may be used interchangeably.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The above-described embodiments of a method and system of fraud detection based on a pattern of transaction ticket size on a payment card network. More specifically, the methods and systems described herein facilitate generating profiles of cardholder spending patterns, including representations of the cardholder's typical spend in various categories of brick and mortar and online stores. In addition, the above-described methods and systems facilitate modeling the spend behavior of cardholders to account for variations in their typical spend patterns, such as, for out-of-town travel for vacations and business, seasonal variations to account for weather or holiday spending changes to the typical spend pattern. As a result, the methods and systems described herein facilitate recommending an approval or decline of a financial transaction in a cost-effective and reliable manner.

This written description uses examples to describe the disclosure, including the best mode, and also to enable any person skilled in the art to practice the disclosure, including making and using any devices or systems and performing any incorporated methods. The patentable scope of the application is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A computer-implemented method for fraud detection based on a pattern of transaction ticket size over a payment card network, the method implemented using a computer device coupled to a memory device, the method comprising:
    electronically receiving transaction information for a current financial transaction initiated by a cardholder with an online merchant, the transaction information including a current transaction amount;
    retrieving a predetermined amount of historical online transactions for the cardholder based on the transaction information, wherein the predetermined amount of historical online transactions includes approved historical online transactions and declined historical online transactions associated with a payment card identifier of the cardholder;
    generating an average ticket size and a standard deviation for the average ticket size for the historical online transactions;
    evaluating a likelihood that the current financial transaction was initiated by the cardholder by determining whether the current transaction amount is within the standard deviation for the average ticket size; and
    generating a recommendation for approval or decline of the current financial transaction based on the evaluation.

2. The computer-implemented method of claim 1, wherein the transaction information includes an identification associated with the online merchant, a transaction amount, a transaction category, a time and date of when the transaction occurred, and a transaction type.

3. The computer-implemented method of claim 1 wherein retrieving the predetermined number of historical online transactions for the cardholder further comprises retrieving the predetermined number of historical online transactions based on a cardholder account identifier included in the transaction information.

4. The computer-implemented method of claim 1, wherein
evaluating the likelihood that the current financial transaction was initiated by the cardholder further comprises determining if the current transaction amount is within the standard deviation for the average ticket size for at least one of a same store, similar stores, and relevant merchant categories.

5. The computer-implemented method of claim 1, wherein generating the average ticket size and the standard deviation for the average ticket size further comprises generating (i) an aggregate ticket size in combination with number of visits over a predefined period of time for the cardholder to at least one of a same store, similar stores, and relevant merchant categories, and (ii) a standard deviation for the aggregated ticket size.

6. The computer-implemented method of claim 1 further comprising:
generating one or more similarity measurements, wherein the one or more similarity measurements include analytical parameters that relate to at least one of a frequency of purchase, an average ticket size for a selected time period, and seasonal adjustments to the analytical parameters; and
transmitting the one or more similarity measurements to a model stored in the memory device.

7. A fraud detection computing device for detecting potential fraudulent transactions in a payment card system using a transaction ticket size pattern, the fraud detection computing device comprising a memory device for storing data, and a processor in communication with the memory device, said processor programmed to:
electronically receive transaction information for a current financial transaction initiated by a cardholder with an online merchant, the transaction information including a current transaction amount;
retrieve a predetermined amount of historical online transactions for the cardholder based on the transaction information, wherein the predetermined amount of historical online transactions includes approved historical online transactions and declined historical online transactions associated with a payment card identifier of the cardholder;
generate an average ticket size and a standard deviation for the average ticket size for the historical online transactions;
evaluate a likelihood that the current financial transaction was initiated by the cardholder by determining whether the current transaction amount is within the standard deviation for the average ticket size; and
generate a recommendation for approval or decline of the current financial transaction based on the evaluation.

8. The fraud detection computing device of claim 7, wherein the transaction information includes an identification associated with the online merchant, a transaction amount, a transaction category, a time and date of when the transaction occurred, and a transaction type.

9. The fraud detection computing device of claim 7, wherein said processor is programmed to retrieve the predetermined number of historical transactions for the cardholder based on a cardholder account identifier included in the transaction information.

10. The fraud detection computing device of claim 7, wherein said processor is further programmed to evaluate the likelihood that the current financial transaction was initiated by the cardholder by determining if the current transaction amount is within the standard deviation for the average ticket size for at least one of a same store, similar stores, and relevant merchant categories.

11. The fraud detection computing device of claim 7, wherein said processor is further programmed to generate the average ticket size and the standard deviation for the average ticket size by generating (i) an aggregate ticket size in combination with a number of visits over a predefined period of time for the cardholder to at least one of a same store, similar stores, and relevant merchant categories, and (ii) a standard deviation for the aggregated ticket size.

12. The fraud detection computing device of claim 11, wherein said processor is further programmed to:
generate one or more similarity measurements, wherein the one or more similarity measurements include analytical parameters that relate to at least one of a frequency of purchase, an average ticket size for a selected time period, and seasonal adjustments to the analytical parameters; and
transmit the one or more similarity measurements to a model stored in the memory device.

13. A non-transitory computer-readable storage media having computer-executable instructions embodied thereon, wherein when executed by at least one processor in communication with a memory device, the computer-executable instructions cause the processor to:
electronically receive transaction information for a current financial transaction initiated by a cardholder with an online merchant, the transaction information including a current transaction amount;
retrieve a predetermined amount of historical online transactions for the cardholder based on the transaction information, wherein the predetermined amount of historical online transactions includes approved historical online transactions and declined historical online transactions associated with a payment card identifier of the cardholder;
generate an average ticket size and a standard deviation for the average ticket size for the historical online transactions;
evaluate a likelihood that the current financial transaction was initiated by the cardholder by determining whether the current transaction amount is within the standard deviation for the average ticket size; and
generate a recommendation for the current financial transaction based on the evaluation.

14. The computer-readable storage media of claim 13, wherein the computer-executable instructions further cause the processor to:
evaluate the likelihood that the current financial transaction was initiated by the cardholder by determining if the current transaction amount is within the standard deviation for the average ticket size for at least one of a same store, similar stores, and relevant merchant categories.

15. The computer-readable storage media of claim 13, wherein the computer-executable instructions further cause the processor to retrieve the predetermined number of historical transactions for the cardholder based on a cardholder account identifier included in the transaction information.

16. The computer-readable storage media of claim 13, wherein the computer-executable instructions further cause the processor to generate the average ticket size and the standard deviation for the average ticket size by generating (i) an aggregate ticket size in combination with a number of visits over a predefined period of time for the cardholder to at least one of a same store, similar stores, and relevant merchant categories, and (ii) a standard deviation for the aggregated ticket size.

\* \* \* \* \*

UNITED STATES PATENT AND TRADEMARK OFFICE
CERTIFICATE OF CORRECTION

PATENT NO. : 10,423,963 B2
APPLICATION NO. : 15/868640
DATED : September 24, 2019
INVENTOR(S) : Qian Wang et al.

Page 1 of 1

It is certified that error appears in the above-identified patent and that said Letters Patent is hereby corrected as shown below:

In the Specification

Column 11, Line 48, delete "web site from" and insert therefor -- website from --.

In the Claims

In Claim 5, Column 19, Lines 15-16, delete "combination with number" and insert therefor -- combination with a number --.

Signed and Sealed this
Nineteenth Day of November, 2019

Andrei Iancu
*Director of the United States Patent and Trademark Office*